United States Patent
D'Urso et al.

(10) Patent No.: US 10,255,569 B2
(45) Date of Patent: *Apr. 9, 2019

(54) MANAGING ASSETS

(71) Applicant: INTERNATIONAL BUSINESS MACHINES CORPORATION, Armonk, NY (US)

(72) Inventors: Michele D'Urso, Rome (IT); Luigi Pichetti, Rome (IT); Marco Secchi, Rome (IT); Stefano Sidoti, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/990,629

(22) Filed: May 26, 2018

(65) Prior Publication Data
US 2018/0276585 A1   Sep. 27, 2018

Related U.S. Application Data

(63) Continuation of application No. 13/681,122, filed on Nov. 19, 2012, now Pat. No. 10,115,066.

(51) Int. Cl.
| | |
|---|---|
| *H04L 12/24* | (2006.01) |
| *H04L 12/58* | (2006.01) |
| *G06Q 10/06* | (2012.01) |
| *G06Q 10/10* | (2012.01) |
| *H04L 29/08* | (2006.01) |
| *H04L 12/771* | (2013.01) |

(52) U.S. Cl.
CPC ..... *G06Q 10/06311* (2013.01); *G06Q 10/107* (2013.01); *H04L 67/1097* (2013.01); *H04L 67/34* (2013.01); *H04L 41/026* (2013.01); *H04L 45/563* (2013.01); *H04L 51/00* (2013.01); *H04L 51/18* (2013.01); *H04L 67/00* (2013.01)

(58) Field of Classification Search
CPC ......... H04L 51/00; H04L 51/18; H04L 67/00; H04L 67/34; H04L 45/563; H04L 41/026
See application file for complete search history.

(56) References Cited

U.S. PATENT DOCUMENTS

| | | | |
|---|---|---|---|
| 6,976,251 | B2 | 12/2005 | Meyerson |
| 6,996,601 | B1 | 2/2006 | Smith |
| 7,194,529 | B2 | 3/2007 | Kupiec et al. |

(Continued)

OTHER PUBLICATIONS

BigFix Resource Center, 2011, published on the world wide web at: http://support.bigfix.com/resources.html.

(Continued)

*Primary Examiner* — Nam T Tran
(74) *Attorney, Agent, or Firm* — Paul S. Drake (57) ABSTRACT

A method for managing assets including receiving a task across a network to be performed by a set of assets, identifying a subset of assets owned by an owner, transmitting a personalized direct communication across the network to the owner, wherein the personalized direct communication requests approval for use of the subset of assets to execute the task, and responsive to receiving an approval communication across the network from the owner indicating respective approved assets from the subset of assets producing a set of approved assets, automatically transmitting a set of communications across the network to the set of approved assets for execution of the task.

10 Claims, 6 Drawing Sheets

(56) References Cited

U.S. PATENT DOCUMENTS

| | | |
|---|---|---|
| 7,197,466 B1 | 3/2007 | Peterson et al. |
| 7,496,670 B1 | 2/2009 | Givoly |
| 7,529,827 B2 | 5/2009 | Devraj et al. |
| 7,636,723 B2 | 12/2009 | Brown et al. |
| 7,716,191 B2 | 5/2010 | Blumenau et al. |
| 7,840,490 B1 | 11/2010 | Sellers et al. |
| 8,037,036 B2 | 10/2011 | Blumenau et al. |
| 2002/0124094 A1 | 9/2002 | Chang et al. |
| 2004/0024655 A1 | 2/2004 | Estes |
| 2006/0080656 A1 | 4/2006 | Cain et al. |
| 2006/0253357 A1 | 11/2006 | Brown et al. |
| 2006/0265688 A1 | 11/2006 | Carlson et al. |
| 2007/0022425 A1 | 1/2007 | Jackson |
| 2007/0094128 A1 | 4/2007 | Rung et al. |
| 2008/0189702 A1 | 8/2008 | Morgan |
| 2008/0235225 A1 | 9/2008 | Michele et al. |
| 2008/0243921 A1 | 10/2008 | Ellisor |
| 2008/0263103 A1 | 10/2008 | McGregor et al. |
| 2009/0271486 A1 | 10/2009 | Ligh |
| 2010/0017419 A1 | 1/2010 | Francis et al. |
| 2010/0131949 A1 | 5/2010 | Ferris |
| 2011/0041079 A1 | 2/2011 | Rive et al. |
| 2011/0063093 A1 | 3/2011 | Fung et al. |
| 2011/0302415 A1 | 12/2011 | Ahmad et al. |
| 2012/0066670 A1 | 3/2012 | McCarthy et al. |
| 2012/0072985 A1 | 3/2012 | Davne et al. |
| 2012/0204032 A1 | 8/2012 | Wilkins et al. |
| 2012/0221684 A1 | 8/2012 | Ferris |
| 2012/0304248 A1 | 11/2012 | Watts et al. |
| 2013/0132854 A1 | 5/2013 | Raleigh et al. |
| 2013/0204906 A1 | 8/2013 | Ko et al. |
| 2013/0232497 A1 | 9/2013 | Jalagam et al. |

OTHER PUBLICATIONS

"IT Asset Management Goes up in the Cloud", PRWeb, Jun. 1, 2010, published on the world wide web at: http://www.prweb.com/releases/2010/06/prweb4068964.htm.

"Systems Management", ATSNetworking.com, published on the world wide web at: https://atsnetworking.com/SiteCollectionDocuments/Services%20PDFs/Systems%20Management2011.pdf.

"Asset Management", Choice-Solutions.com, published on the world wide web at: http://www.choice-solutions.com/mgt_services/rms.html.

"SMS Survey Software", afridesign.com, published on the world wide web at: http://www.afridesign.com/sms-survey.php.

"Short Message Service", Wikipedia.org, published on the world wide web at: http://en.wikipedia.org/wiki/Short_Message_Service.

USPTO Office Action, dated Jun. 23, 2016, for U.S. Appl. No. 13/775,220, filed Feb. 24, 2013 entitled "Managing Assets", which is a continuation of the parent application of the present application.

"Systems Management", ATSNetworking.com, published Nov. 2011 on the world wide web at: https://atsnetworking.com/SiteCollectionDocuments/Services%20PDFs/Systems%20Management2011.pdf.

"Asset Management", Choice-Solutions.com, published Nov. 10, 2011 on the world wide web at: https://web.archive.org/web/20111110140252/http://www.choice-solutions.com/mgt_services/rms.html.

"SMS Survey Software", afridesign.com, published Sep. 2010 on the world wide web at: https://web.archive.org/web/20100917035243/http://afridesign.com/sms-survey.php.

"Short Message Service", Wikipedia.org, published Oct. 2011 on the world wide web at: https://web.archive.org/web/20111016191455/http://en.wikipedia.org/wiki/Short_Message_Service.

MANAGING ASSETS

This application is a continuation of application Ser. No. 13/681,122 filed Nov. 19, 2012 entitled "MANAGING ASSETS", the disclosure of which is incorporated in its entirety herein by reference.

BACKGROUND

1. Technical Field

The present invention relates generally to managing assets, and in particular, to a computer implemented method for managing assets performing tasks with owner approval.

2. Description of Related Art

Today companies and other enterprises manage a large number of on-line assets. These assets can include software products, interconnected servers, and multi-way communications. These assets are utilized to provide services such as email, virtual machines, management applications, business applications, etc. These assets may be implemented internally to an enterprise, or they may be implemented externally such as in a cloud environment.

Managing these assets to maintain secure and uninterrupted services is becoming more difficult as the complexity of these assets and their interconnections increases. This may be increasingly true as enterprises are outsourcing their assets and services to other companies such as through cloud environments.

SUMMARY

The illustrative embodiments provide a method for managing assets including receiving a task across a network to be performed by a set of assets, identifying a subset of assets owned by an owner, transmitting a personalized direct communication across the network to the owner, wherein the personalized direct communication requests approval for use of the subset of assets to execute the task, and responsive to receiving an approval communication across the network from the owner indicating respective approved assets from the subset of assets producing a set of approved assets, automatically transmitting a set of communications across the network to the set of approved assets for execution of the task.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

DETAILED DESCRIPTION

Processes and devices may be implemented and utilized to utilize emails to manage on-line assets. These processes and apparatuses may be implemented and utilized as will be explained with reference to the various embodiments below.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in as needed. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
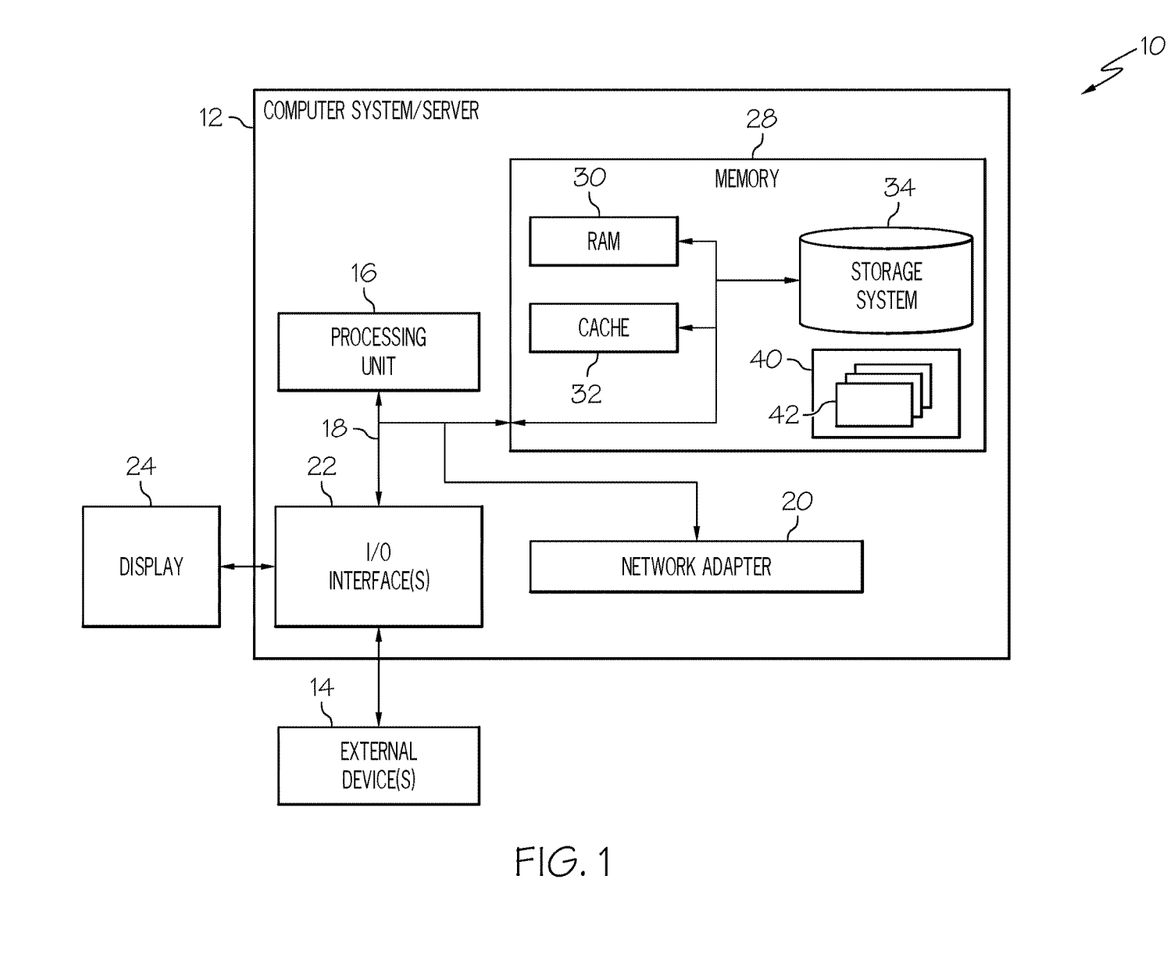
FIG. 1 depicts a cloud computing node according to an embodiment of the present invention in which various embodiments may be implemented.

Referring now to FIG. 1, a schematic of an example of a cloud computing node (also referred to herein as a virtual node or virtual machine) is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
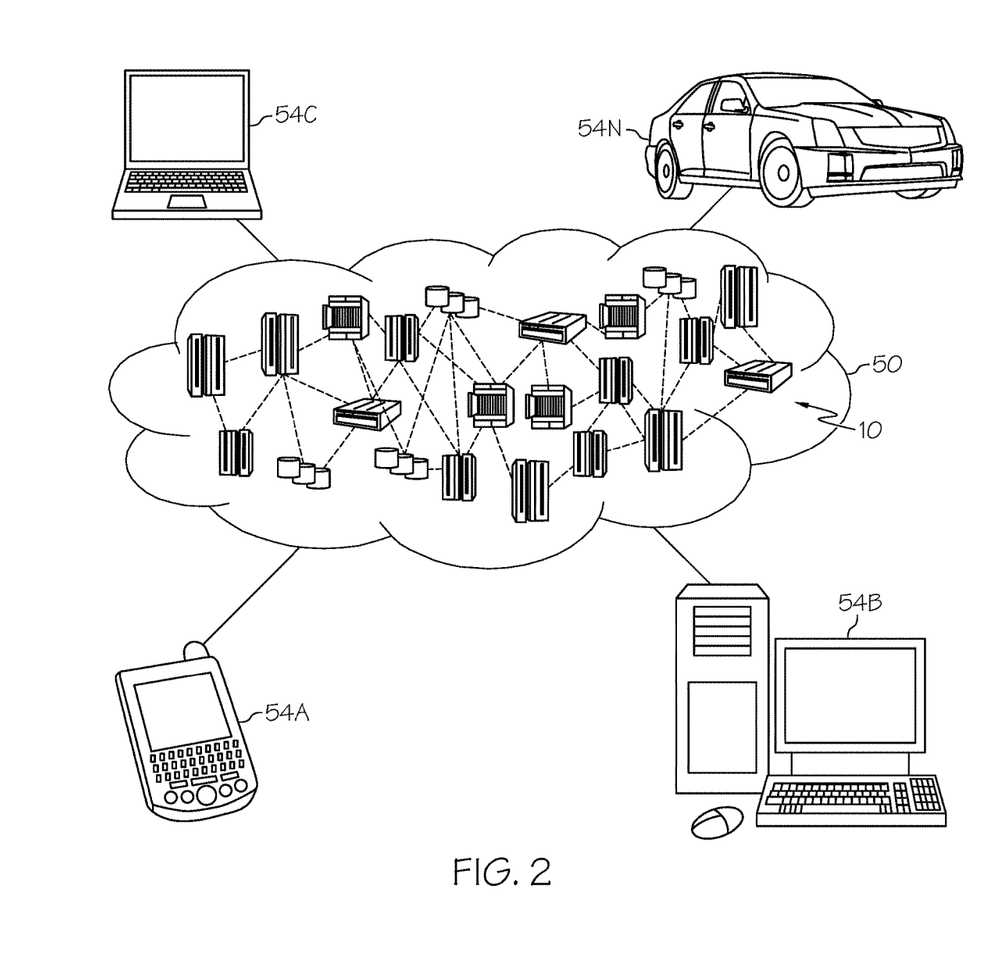
FIG. 2 depicts a cloud computing environment in which various embodiments may be implemented.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
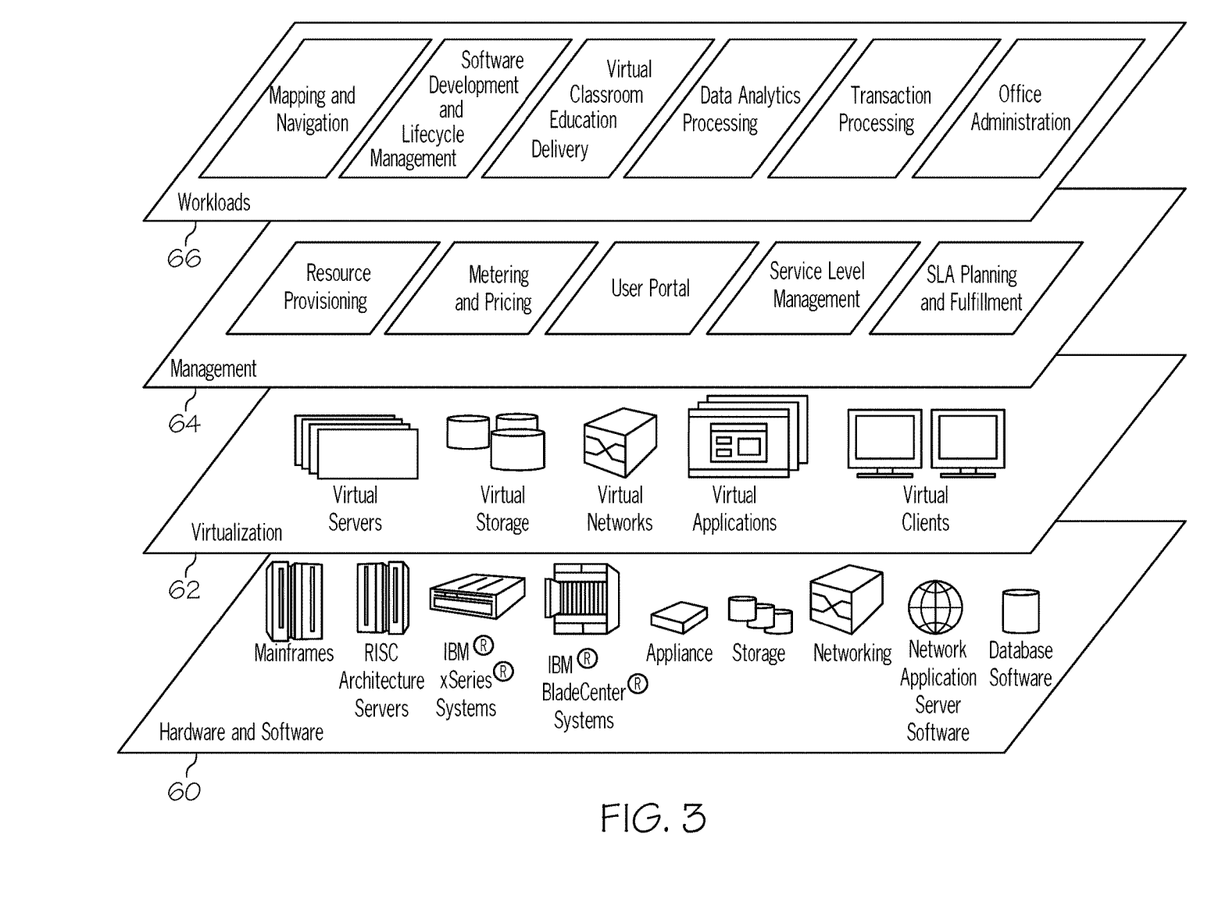
FIG. 3 depicts abstraction model layers in which various embodiments may be implemented.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; a type of cloud computing platform referred to herein as an appliance; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment including providing for secure and trusted communications. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and an office administration.

Figure 4:
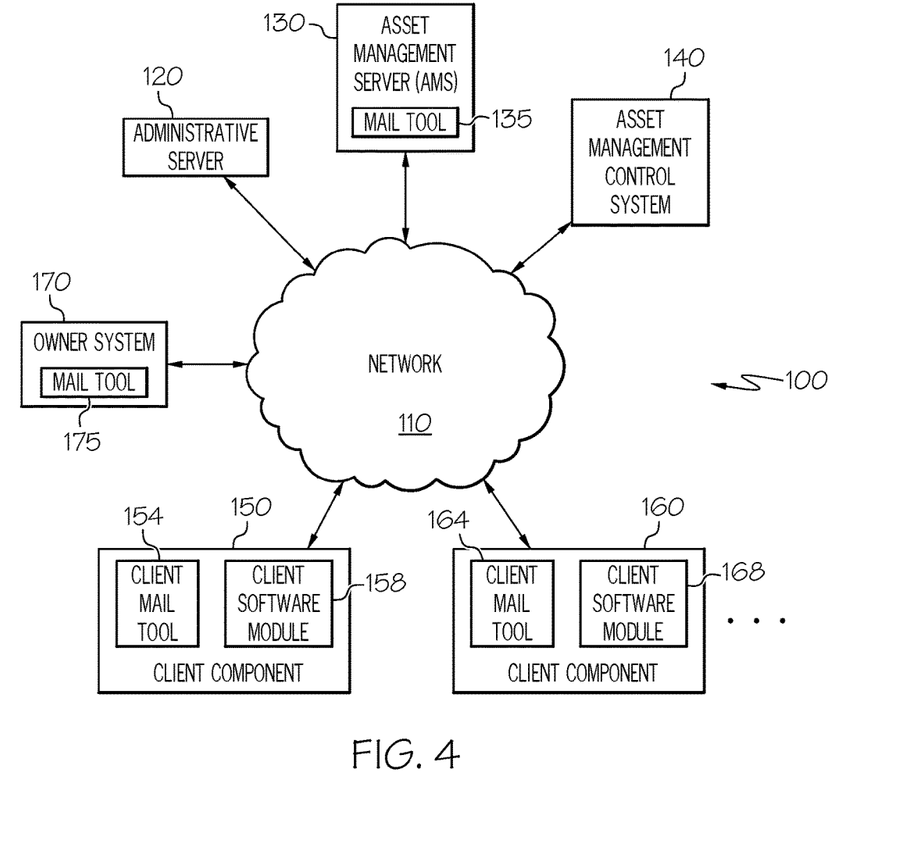
FIG. 4 depicts a block diagram of an asset management environment in which various embodiments may be implemented.

FIG. 4 depicts a block diagram of an asset management environment 100 in which various embodiments may be implemented. A network 110 is shown for handling communications between the various components shown. Network 110 may be a standard internal network such as may be implemented in an enterprise. Network 110 may also be the internet with some or all of the components located in different enterprises. Network 110 may also be a cloud implementation with each component being a virtual machine within that cloud. Network 110 may further be a combination of an internal network, the internet, and a cloud implementation with various components in various locations. For example, two components may be in the cloud with the rest of the components being located in different enterprises across the internet.

An administrative server 120 is shown which is utilized by an administrator to manage IT (information technology) assets. These assets may be in one enterprise or across multiple enterprises. The administrator may communicate with the administrative server through a local computer (not shown) or at a terminal directly connected to the administrative server. An asset management server (AMS) 130 is shown. The asset management server is utilized to manage the IT assets under the direction of the administrator. Asset management server 130 includes a mail tool 135 for communicating with other assets as described below, although other means of communicating with those assets may be utilized depending on the environment and any system management tools that are in place with those assets. For example, in a multi-enterprise environment where each enterprise may utilize different systems management systems, email may be the preferred means for communicating with the client assets due to the strong existing infrastructure for passing emails across the internet and because many Unix systems like Linux have a native mail client embedded. However, in a single enterprise environment or a multi-enterprise environment where a common systems management system is utilized across all enterprises, the existing system management tools may be preferred, particularly if email clients are not embedded in the client assets. A mail tool is shown for machine to machine communications herein as the more general solution across many types of environments.

Mail tool 135 may utilize SMTP/POP (simple mail transfer protocol/post office protocol) standards for these email communications. Alternative types of mail tools may be utilized including tools for texting or instant messaging. Texting utilizing a short message service (SMS) infrastructure is generally used for communications in a mobile phone environment and instant messaging is generally used for communications over the internet. Although not illustrated herein, the infrastructure for texting and instant messaging is well known in the art and may be utilized by those of ordinary skill in the art for use with any of the embodiments shown herein. Collectively, emails, text messages, instant messages and other similar communications are referred to herein as personalized direct communications. Collectively, the use of systems management tools and personalized direct communications are referred to herein as communications. An asset management control system 140 is shown. The asset management control system includes a database of the various client assets, their owners, and the email addresses of those owners and the client assets. The information in asset management control system is utilized by the AMS for managing the IT assets. Asset management control system 140 may be a part of the AMS. AMS 130 manages asset management control system 140 by keeping it up to date as more client assets are added, removed, or otherwise changed.

Two client components 150 and 160 are shown. Many additional client components may be included. A component is a hardware or software entity that includes an IT asset which may be updated, modified, etc. by an asset management task. Each component includes a client mail tool 154 and 164 for communicating with the AMS as well as other secure communications, although other means of communicating with the AMS may be utilized depending on the environment and the system management tools that are in place with those assets. For example, as described above, in a multi-enterprise environment, email may be the preferred means for communicating with the AMS where in a single enterprise solution the existing system management tools may be utilized. Each component also includes a client software module 158 and 168 for implementing approved tasks as will be described below.

An owner system 170 is also shown with a mail tool 175. Owner system is utilized for communicating with an owner of the various IT assets. If there are multiple owners, each owner having ownership of various IT assets, then there may be multiple owner systems. The owner may communicate with the owner system directly as a local computer or at a terminal connected directly or indirectly to the owner system.

Figure 5:
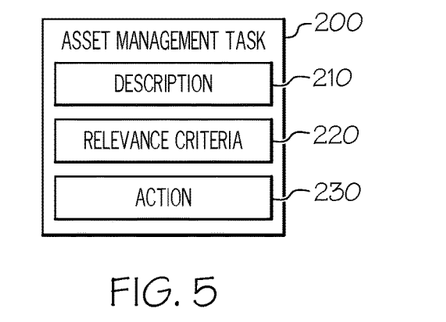
FIG. 5 depicts a block diagram of various elements of an asset management task (AMT) in which various embodiments may be implemented.

FIG. 5 depicts a block diagram of various elements of an asset management task (AMT) 200 in which various embodiments may be implemented. Task 200 can include a software patch, a software update, an agent or other software to be implemented to implement additional services or capabilities, or other types of actions which an administrator may desire to implement utilizing an AMT.

Task 200 includes three primary elements, a description section 210, a relevance section 220, and an action section 230. Additional or alternative elements may be utilized in alternative embodiments. Description section 210 includes a description of a task to be performed. This description is utilized to inform the owner of the relevant software or hardware of the desired task for the purpose of obtaining the owner's approval. Relevance section 220 identifies criteria utilized to determine which software and/or hardware the task applies to. For example, the criteria may include a version of a specific type of software to be updated with a security patch. Action section 230 includes the specific instructions used to implement the desired task to the relevant assets. These instructions may be in a variety of forms including a high level or low level software language.

Figure 6:
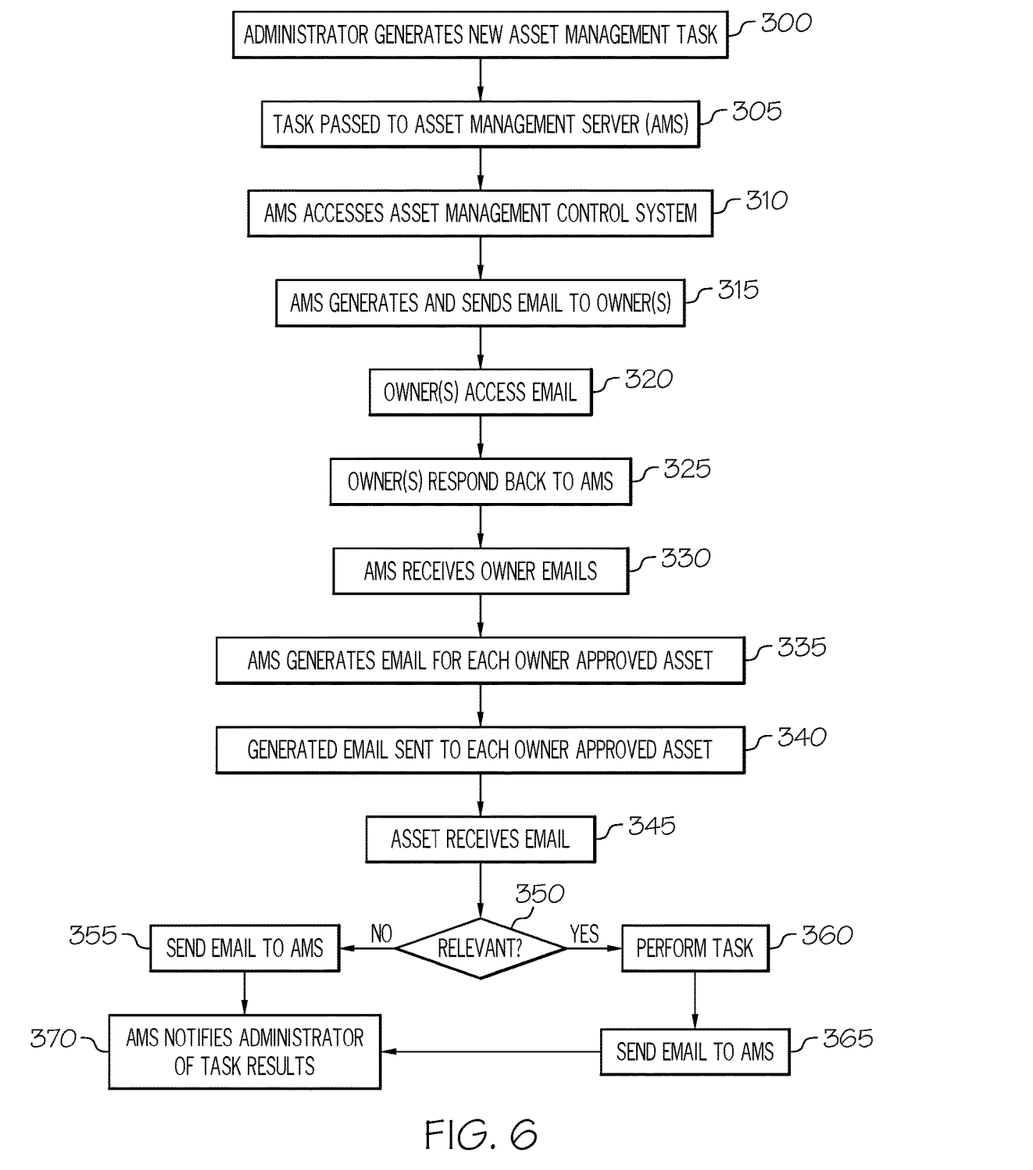
FIG. 6 depicts a flow diagram of implementing an asset management task (AMT) in accordance with a first embodiment.

FIG. 6 depicts a flow diagram of implementing an asset management task (AMT) in accordance with a first embodiment. In a first step 300, an administrator generates a new asset management task (referred to herein as AMT or task) on an asset server for implementation. This AMT includes a description of the task, criteria used to determine which assets are relevant, and the specific instructions necessary to implement the AMT for the relevant assets. Subsequently in step 305, the AMT is passed to the asset management server (AMS) for obtaining approval and then implementing the task. The AMT may be passed from the administrator to the AMS by direct input to the administrative server such as through a systems management tool communication or indirectly such as across a secure internet connection or through an email or other form of personalized direct communication to the administrative server. This communication may be automatic, meaning that the communication is sent without human intervention once the AMT is entered into the asset server by the administrator. The AMS then automatically accesses an asset management control system in step 310 to identify the assets and their owner(s) including the email addresses or other contact information of the owner(s) and assets. This access may be directly such as by accessing a local database or indirectly such as through a secure connection across the internet.

Once the assets, their owners, and the email addresses of the owners and assets are identified, then in step 315 the AMS automatically generates and sends an email or other personalized direct communication to each asset owner including the description of the task and a checklist of the assets for that owner. The personalized direct communication may be an email utilizing an existing SMTP/POP infrastructure or it may be a text message (short message service or multimedia messaging service), instant message or other similar communication method to directly contact the owner automatically. If email, this and subsequent steps take advantage of an already integrated email infrastructure that is flexible and dynamic for a variety of environments including cloud based implementations. These emails may be cached and then sent to the owners periodically at pre-designated time interval. The caching may also occur just prior to generating the emails when the owner(s) have been identified, or even at the point where the task was first submitted by the administrator.

In step 320, each owner can then access the email or other personalized direct communication sent to that owner and read the task description with the checklist of assets. Each owner can then determine which of the assets listed should be selected for implementation of the described task. Some assets may be in a testing phase where stability is desired and no changes would be approved. Other assets may have been reverted to an earlier snapshot where the described task would not be appropriate. The owner may also determine that the task is unnecessary and may refuse authorization of the task for any asset. The owner may further determine that the task is needed for all the listed assets. Other factors not listed here can affect a decision by the owner including costs, timing, etc. Each owner can then respond back to the AMS in step 325 through an approval communication such as an email or other personalized direct communication with a checklist selection of assets approved (or not approved) for a determination of relevance and an implementation of the task for relevant assets. Although a checklist is described in this embodiment, alternative methods of indicating which assets are approved may be utilized. For example, a selection of the word "All", "None", within a description of the types of assets approved can be analyzed with natural language processing. For another example which may be used in an SMS implementation, a question and answer dialog could be utilized such as "Do you approve the XYZ update process to be run on the ABC server in the time period between 3 to 4 AM (Yes or No)?" where the owner may reply "Yes" or "No". Alternative embodiments may utilize other similar techniques for indicating the approved assets.

In step 330, the asset management server (AMS) receives the response email or other personalized direct communication from the owner. Subsequently in step 335, the AMS automatically generates a communication such as an email, other personalized direct communication, or a systems management tool communication, for each asset approved by the owner for determination of relevance and subsequent implementation of the task without requiring human intervention. Although an email is described as the form of machine to machine communication for this embodiment, alternative methods for machine to machine communications includes utilizing existing systems management tools that may be in place depending on the environment. This email includes the address of the approved asset (e.g. the virtual machine including the software to be updated), the criteria utilized for a determination of relevance, the action to be taken if relevance is determined, and a unique tag. The unique tag is compatible with the email standard format (e.g. MIME or multipurpose internet mail extension) and is utilized by the AMS and client module for tracking purposes. In step 340, each generated email or other personalized direct communication is automatically sent to each approved asset for that determination of relevance and implementation of the task.

Subsequently in step 345, the approved asset receives the AMS generated email, other personalized direct communication, or systems management tool communication. In step 350, the client component automatically determines whether the task is relevant to any IT component included in that asset. If not, then in step 355 an email, other personalized direct communication, or systems management tool communication with the unique tag is automatically sent back to the AMS specifying that no action was taken due to a lack of relevance, then processing continues to step 370. If yes in step 350, then in step 360 the client software module automatically implements the task. An email, other personalized direct communication, or systems management tool communication with the unique tag is then automatically generated and sent to the AMS in step 365 specifying whether the task was successfully implemented or not, and processing continues to step 370. In step 370, the AMS receives the emails, other personalized direct communications, and/or other systems management tool communications from steps 355 and 365 and automatically provides that information to the administrator. Many of the steps above may be performed automatically without human intervention, thereby streamlining the process for increased efficiency, although manual operation of certain steps may be implemented according to the system configuration and user preferences.

Figure 7:
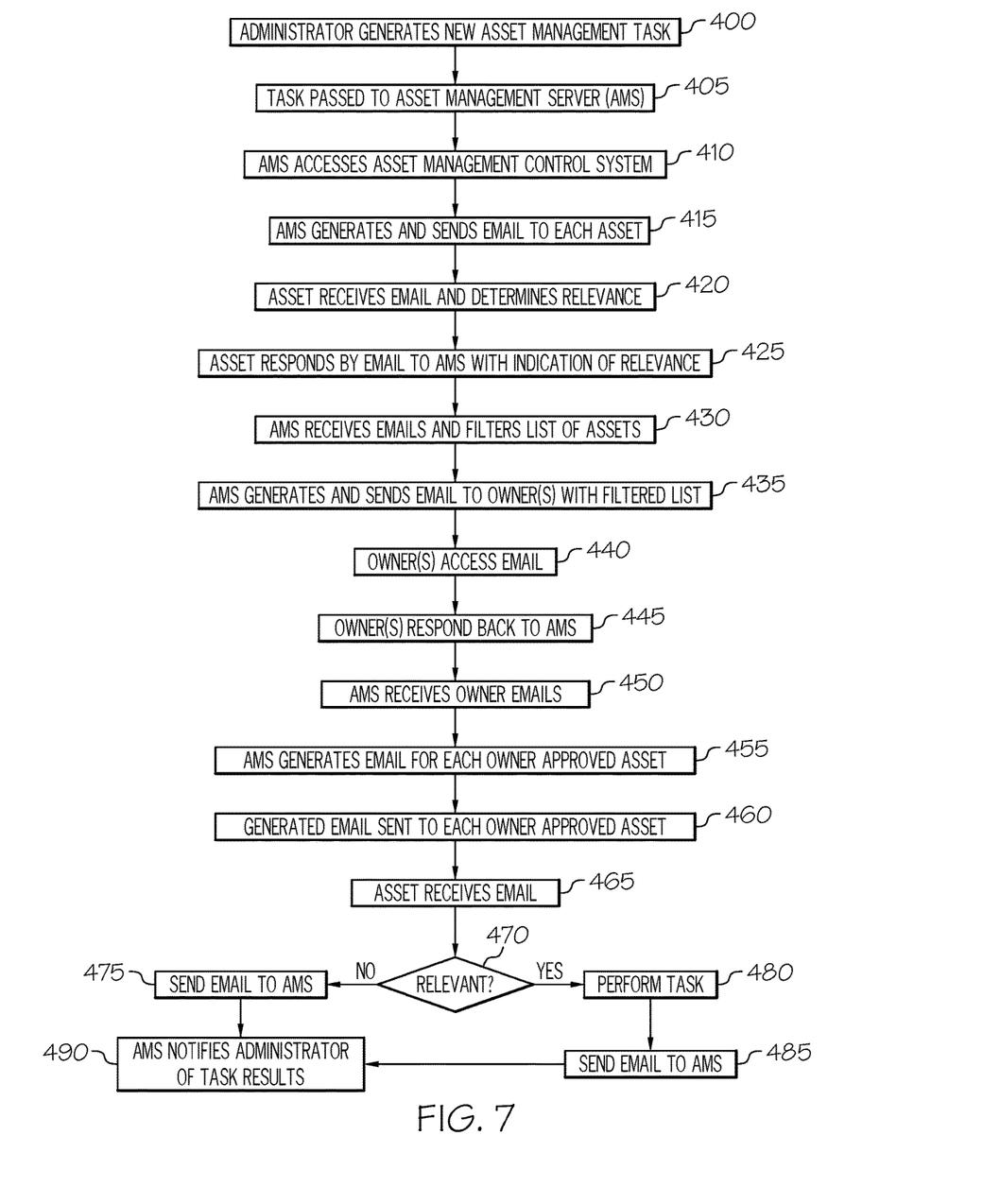
FIG. 7 depicts a flow diagram of implementing an asset management task (AMT) in accordance with a second embodiment.

FIG. 7 depicts a flow diagram of implementing an asset management task (AMT) in accordance with a second embodiment. This embodiment limits the list of assets sent to the owner to those assets that are relevant to the task. In a first step 400, an administrator generates a new asset management task (referred to herein as AMT or task) on an asset server for implementation. This AMT includes a description of the task, criteria used to determine which assets are relevant, and the specific instructions necessary to implement the AMT for the relevant assets. Subsequently in step 405, the AMT is passed to the asset management server (AMS) for obtaining approval and then implementing the task. The AMT may be passed from the administrator to the AMS by direct input to the administrative server such as through a systems management tool communication or indirectly such as across a secure internet connection or through an email or other form of personalized direct communication to the administrative server. This communication may be automatic, meaning that the communication is sent without human intervention once the AMT is entered into the asset server by the administrator. The AMS then automatically accesses an asset management control system in step 410 to identify the assets and their owner(s) including the email addresses or other contact information of the assets and owner(s). This access may be directly such as by accessing a local database or indirectly such as through a secure connection across the internet.

Once the assets, their owners, and the email addresses of the assets and owners are identified, then in steps 415 through 430, the AMS automatically performs a set of filtration steps to determine which if the identified assets are relevant to the task. These filtration steps may be performed for every owner, or they may be performed only when the owner approves or requests such filtration. In step 415 the AMS automatically generates an inquiry email, other personalized direct communication, or systems management tool communication to each asset to determine whether the task may apply to that asset. Although an email is described as the form of machine to machine communication in this embodiment, alternative methods for machine to machine communications includes utilizing existing systems management tools that may be in place depending on the environment. This inquiry email includes the address of the approved asset (e.g. the virtual machine including the software to be updated), the criteria utilized for a determination of relevance, the action to be taken once relevance is determined (i.e. an email back to the AMS stating whether the task is relevant to that asset), and a unique tag. The unique tag is compatible with the email standard format (e.g. MIME or multipurpose internet mail extension) and is utilized by the AMS and client module for tracking purposes. Each generated inquiry email, other personalized direct communication, or systems management tool communication is automatically sent to each approved asset for that determination of relevance and implementation of the task (i.e. to respond to the question of relevance).

In step 420, each asset receiving the inquiry email, other personalized direct communication, or systems management tool communication then automatically determines relevance (e.g. that the asset includes a certain generation of software), then automatically performs a task of responding to the AMS in step 425. That response includes an indication whether the task is relevant to the asset or not. The response may be in the form received such as an email, other personalized direct communication, or systems management tool communication. A non-response may be determined to be a lack of relevance by the non-responding asset. In step 430, the AMS receives the responses from each asset and then automatically filters the list of assets for each owner, thereby reducing the number of assets that the owner has to review.

Then in step 435 the AMS automatically generates and sends an email or other personalized direct communication to each asset owner including the description of the task and a checklist of the relevant assets for that owner. The personalized direct communication may be an email utilizing an existing SMTP/POP infrastructure or it may be a text message (short message service or multimedia messaging service), instant message or other similar communication method to directly contact the owner automatically. If email, this and other steps described herein take advantage of an already integrated email infrastructure that is flexible and dynamic for a variety of environments including cloud based implementations. These emails may be cached and then sent to the owners periodically at pre-designated time interval. The caching may also occur just prior to generating the emails when the owner(s) have been identified, or even at the point where the task was first submitted by the administrator.

In step 440, each owner can then access the email or other personalized direct communication sent to that owner and read the task description with the checklist of assets. Each owner can then determine which of the assets listed should be selected for implementation of the described task. Some assets may be in a testing phase where stability is desired and no changes would be approved. Other assets may have been reverted to an earlier snapshot where the described task would not be appropriate. The owner may also determine that the task is unnecessary and may refuse authorization of the task for any asset. The owner may further determine that the task is needed for all the listed assets. Other factors not listed here can affect a decision by the owner including costs, timing, etc. Each owner can then respond back to the AMS in step 445 through an approval communication such as an email or other personalized direct communication with a checklist selection of assets approved (or not approved) for a determination of relevance and an implementation of the task for relevant assets. Although a checklist is described in this embodiment, alternative methods of indicating which assets are approved may be utilized. For example, a selection of the word "All", "None", within a description of the types of assets approved which can be analyzed with natural language processing. For another example which may be used in an SMS implementation, a question and answer dialog could be utilized such as "Do you approve the XYZ update process to be run on the ABC server in the time period between 3 to 4 AM (Yes or No)?" where the owner may reply "Yes" or "No". Alternative embodiments may utilize other similar techniques for indicating the approved assets.

In step 450, the asset management server (AMS) receives the response email or other personalized direct communication from the owner. Subsequently in step 455, the AMS automatically generates an email, other personalized direct communication, or systems management tool communication for each asset approved by the owner for a confirmation of relevance (in case there have been changes related to relevance since the asset was queried as described above) and subsequent implementation of the task without requiring human intervention. This email includes the address of the approved asset (e.g. the virtual machine including the software to be updated), the criteria utilized for a determination of relevance, the action to be taken if relevance is determined, and a unique tag. The unique tag is compatible with the email standard format (e.g. MIME or multipurpose internet mail extension) and is utilized by the AMS and client module for tracking purposes. In step 460, each generated email, other personalized direct communication, or systems management tool communication is sent to each approved asset for that confirmation of relevance and implementation of the task.

Subsequently in step 465, the approved asset receives the AMS generated email, other personalized direct communication or systems management tool communication. In step 470, the client component automatically determines whether the task is relevant to any IT component included in that asset. If not, then in step 475 an email, other personalized direct communication, or systems management tool communication with the unique tag is automatically sent back to the AMS specifying that no action was taken due to a lack of relevance and processing continues to step 490. If yes in step 470, then in step 480 the client software module automatically implements the task. An email, other personalized direct communication or systems management tool communication with the unique tag is then automatically generated and sent to the AMS in step 485 specifying whether the task was successfully implemented or not, then processing continues to step 490. In step 490, the AMS receives the emails, other personalized direct communications, or systems management tool communication from steps 475 and 485 and automatically provides that information to the administrator. Many of the steps above may be performed automatically without human intervention, thereby streamlining the process for increased efficiency, although manual operation of certain steps may be implemented according to the system configuration and user preferences.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for utilizing emails to manage on-line assets. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for use in managing information technology assets owned by a set of owners comprising:
receiving an asset management task from an administrator across a network, the asset management task including a description of the asset management task to be performed for review and approval by a user on an owner system for each of the set of owners, criteria for identifying which information technology assets are to perform the asset management task, and specific instructions to be executed by a set of information technology assets owned by the set of owners and approved to perform the asset management task;
automatically without human intervention identifying a subset of the information technology assets owned by each of the set of owners;
automatically without human intervention transmitting a personalized direct communication across the network to the owner system of each of the set of owners including the received description of the asset management task to be performed, wherein the personalized direct communication requests approval, for the subset of assets to perform the asset management task, by the user of the owner system for each of the set of owners;

requesting each of the subset of information technology assets to identify whether that information technology asset meets the criteria set forth in the asset management task for identifying which information technology assets are to perform that asset management task; and responsive to receiving an approval communication across the network from the owner system for each of the set of owners indicating respective owner approved information technology assets from the subset of information technology assets producing a set of approved information technology assets, automatically transmitting a set of communications across the network to the set of approved information technology assets for execution of the specific instructions by each approved information technology asset which identified itself as meeting the criteria by the subset of information technology assets;

wherein the set of communications, transmitted across the network to the set of approved information assets in response to receiving an approval communication from the owner, includes the criteria from the administrator and the request for each of the set of information technology assets to identify whether that approved information technology asset is to perform the asset management task; and wherein the information technology assets are provided the criteria received from the administrator for identifying which of the information technology assets are to execute the specific instructions included in the received asset management task.

2. The method of claim 1 wherein the personalized direct communication to the owner system of each of the set of owners is an email.

3. The method of claim 2 wherein the email to the owner system of each of the set of owners utilizes an SMTP/POP infrastructure.

4. The method of claim 1 wherein the set of communications to the set of approved assets is a set of emails, each email to one of the set of approved assets.

5. The method of claim 4 further comprising receiving a communication from each of the set of approved assets indicating whether the task was performed.

6. The method of claim 5 wherein the communication from each of the set of approved assets indicating whether the task was performed is an email.

7. The method of claim 5 wherein each of the set of emails transmitted to the set of approved assets includes a tag identifying the email and wherein the communication from each of the set of approved assets includes a reference to the tag.

8. The method of claim 1 further comprising transmitting, prior to transmitting a personalized direct communication to the owner system of each of the set of owners, a set of communications to the information technology assets to identify which assets are to perform the asset management task in accordance with the criteria received from the administrator prior to receiving approval by a user on an owner system for each of the set of owners, and wherein the personalized direct communication to the owner system of each of the set of owners only includes identified assets.

9. The method of claim 1 further comprising receiving a set of user preferences from the owner system; and caching the personalized direct communication in accordance with the user preferences prior to transmitting the personalized direct communication across the network to the owner system.

10. The method of claim 9 wherein the cached personalized direct communication is transmitted when the set of owners has been identified.

* * * * *